United States Patent
Lutz et al.

(10) Patent No.: US 12,045,766 B2
(45) Date of Patent: Jul. 23, 2024

(54) AUTOMATED AIRCRAFT BAGGAGE LOCALIZATION

(71) Applicant: The Boeing Company, Chicago, IL (US)

(72) Inventors: Andre Lutz, Neu-Isenburg (DE); Robin Drews, Chicago, IL (US); Karol Ciba, Chicago, IL (US); Ralf Rene Cabos, Chicago, IL (US)

(73) Assignee: The Boeing Company, Arlington, VA (US)

( * ) Notice: Subject to any disclaimer, the term of this patent is extended or adjusted under 35 U.S.C. 154(b) by 12 days.

(21) Appl. No.: 17/968,171

(22) Filed: Oct. 18, 2022

(65) Prior Publication Data
US 2024/0127161 A1    Apr. 18, 2024

(51) Int. Cl.
*G06Q 10/0833*   (2023.01)
*G06K 7/10*       (2006.01)
*G06K 19/07*      (2006.01)

(52) U.S. Cl.
CPC ..... *G06Q 10/0833* (2013.01); *G06K 7/10297* (2013.01); *G06K 19/0723* (2013.01); *G06K 2007/10504* (2013.01)

(58) Field of Classification Search
CPC .......... G06K 7/10297; G06K 19/0723; G06K 2007/10504
See application file for complete search history.

(56) References Cited

U.S. PATENT DOCUMENTS

| | | | |
|---|---|---|---|
| 7,030,760 B1 | 4/2006 | Brown | |
| 2007/0097211 A1 | 5/2007 | Washington | |
| 2008/0108372 A1 | 5/2008 | Breed | |
| 2008/0258973 A1* | 10/2008 | Heidari-Bateni | G01S 13/767 342/387 |

(Continued)

OTHER PUBLICATIONS

Wikipedia: "Radiolocation", retrieved from the Internet: URL:https://en.wikipedia.org/w/index.php?title=Radiolocation&oldid=1115186447 on Feb. 8, 2024.

(Continued)

*Primary Examiner* — Nabil H Syed
*Assistant Examiner* — Cal J Eustaquio
(74) *Attorney, Agent, or Firm* — McDonnell Boehnen Hulbert & Berghoff LLP (57) ABSTRACT

An example system includes at least two transceivers configured to be coupled to an interior of a cargo compartment of an aircraft, and to detect radio frequency identification (RFID) signals from an RFID tag coupled to baggage stored in the cargo compartment. The system also includes a processor configured to perform operations including receiving the signals detected by the transceivers. The operations also include based on runtimes of the signals, determining a respective distance from the baggage to each transceiver, where the respective distance defines a boundary centered at a known location of the transceiver and along which the baggage is estimated to be located relative to the transceiver. The operations also include identifying locations at which the boundaries of the transceivers intersect and, based on the locations, detecting an estimated storage location of the baggage. The operations also include controlling a display device to display the estimated storage location.

20 Claims, 4 Drawing Sheets

(56) References Cited

U.S. PATENT DOCUMENTS

| | | | | |
|---|---|---|---|---|
| 2009/0015398 A1* | 1/2009 | Bhogal | .................. | A45C 13/18 |
| | | | | 340/572.1 |
| 2009/0295544 A1* | 12/2009 | Bayer | ...................... | G07C 9/28 |
| | | | | 235/492 |
| 2017/0372105 A1* | 12/2017 | Coxall | ............... | G06K 7/10386 |
| 2018/0247094 A1* | 8/2018 | Khojastepour | ......... | G01S 13/75 |
| 2022/0207313 A1* | 6/2022 | Huijsing | ............ | B64D 11/0015 |

OTHER PUBLICATIONS

Extended European Search Report prepared by the European Patent Office in application No. EP 23 19 8224.0 dated Feb. 29, 2024.

* cited by examiner

AUTOMATED AIRCRAFT BAGGAGE LOCALIZATION

FIELD

The present disclosure relates generally to aircraft baggage localization, and more particularly, to using radio frequency identification (RFID) technology to estimate baggage location within an aircraft cargo compartment.

BACKGROUND

In practice, passenger baggage is often manually loaded into a cargo compartment of an aircraft, such as a commercial aircraft. This can make it difficult to locate specific baggage for retrieval in certain situations. For example, when a passenger does not show up at the gate, that passenger's baggage will need to be removed from the cargo compartment, and if the baggage was manually loaded into the cargo compartment along with numerous other baggage, it can take an undesirable amount of time and effort to locate that passenger's baggage.

Existing solutions for addressing this issue involve scanning baggage prior to loading, in order to know which order bags are loaded into the cargo compartment and to know which specific cargo compartment a particular bag is loaded into. Other solutions involve use of containers within the cargo compartment, each with a dedicated position, and tracking which bag is loaded into which container. However, these existing solutions can still be inefficient for locating specific baggage, particularly in situations where baggage needs to be quickly removed and where there are numerous other bags in the cargo compartment or in containers.

What is needed is an improved system for locating baggage within a cargo compartment of an aircraft.

SUMMARY

In an example, a system is described. The system includes at least two transceivers configured to be coupled to an interior of a cargo compartment of an aircraft, and further configured to detect radio frequency identification (RFID) signals from an RFID tag coupled to baggage stored in the cargo compartment. The system also includes a processor configured to perform a set of operations. The set of operations includes receiving the RFID signals detected by the at least two transceivers. The set of operations also includes based on runtimes of the RFID signals, determining, for each transceiver of the at least two transceivers, a respective distance from the baggage to the transceiver, where the respective distance defines a boundary that is centered at a known location of the transceiver and along which the baggage is estimated to be located with respect to the transceiver. The set of operations also includes identifying locations at which the boundaries of the at least two transceivers intersect. The set of operations also includes based on the locations at which the boundaries of the at least two transceivers intersect, detecting an estimated storage location of the baggage. The set of operations also includes controlling a display device to display the estimated storage location.

In another example, a method is described. The method includes receiving, by a processor, radio frequency identification (RFID) signals detected by at least two transceivers from an RFID tag coupled to baggage stored in a cargo compartment of an aircraft, where the at least two transceivers are coupled to an interior of the cargo compartment. The method also includes based on runtimes of the RFID signals, determining, by the processor, for each transceiver of the at least two transceivers, a respective distance from the baggage to the transceiver, where the respective distance defines a boundary that is centered at a known location of the transceiver and along which the baggage is estimated to be located with respect to the transceiver. The method also includes identifying, by the processor, locations at which the boundaries of the at least two transceivers intersect. The method also includes based on the locations at which the boundaries of the at least two transceivers intersect, detecting, by the processor, an estimated storage location of the baggage. The method also includes controlling, by the processor, a display device to display the estimated storage location.

In another example, a non-transitory computer readable medium having stored thereon instructions, that when executed by one or more processors of a computing device, cause the computing device to perform a set of operations is described. The set of operations includes receiving radio frequency identification (RFID) signals detected by at least two transceivers from an RFID tag coupled to baggage stored in a cargo compartment of an aircraft, wherein the at least two transceivers are coupled to an interior of the cargo compartment. The set of operations also includes based on runtimes of the RFID signals, determining, for each transceiver of the at least two transceivers, a respective distance from the baggage to the transceiver, where the respective distance defines a boundary that is centered at a known location of the transceiver and along which the baggage is estimated to be located with respect to the transceiver. The set of operations also includes identifying locations at which the boundaries of the at least two transceivers intersect. The set of operations also includes based on the locations at which the boundaries of the at least two transceivers intersect, detecting an estimated storage location of the baggage. The set of operations also includes controlling a display device to display the estimated storage location.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Unless otherwise specifically noted, elements depicted in the drawings are not necessarily drawn to scale.

Within examples, described herein is a system and corresponding method for localizing baggage within a cargo compartment of an aircraft. The disclosed system, for example, includes at least two transceivers configured to be coupled to an interior of the cargo compartment of the aircraft, and also configured to detect radio frequency identification (RFID) signals from an RFID tag coupled to baggage stored in the cargo compartment. For example, two transceivers can be located in a particular cargo compartment of an aircraft, both located on the same longitudinal side of the aircraft, with one transceiver positioned at an aft end of the cargo compartment and another transceiver positioned at a front end of the cargo compartment.

The disclosed system also includes a processor that is configured to perform various operations. Specifically, the processor receives the RFID signals detected by the at least two transceivers and, based on runtimes of those RFID signals, determines for each transceiver, a respective distance from the baggage to the transceiver. The respective distance from the baggage to a given transceiver defines a boundary that is centered at a known location of the transceiver and along which the baggage is estimated to be located with respect to the transceiver. The processor then identifies locations at which the boundaries of the at least two transceivers intersect, detects an estimated storage location of the baggage based on the identified locations, and controls a display device to display the estimated storage location.

By calculating an approximate position at which a particular bag is located within the cargo compartment, the disclosed system allows for more efficient removal of the bag from the cargo compartment, such as in a situation in which the airline must remove a passenger's checked bag when that passenger does not show up to the gate by the departure time.

These and other improvements are described in more detail below. Implementations described below are for purposes of example. The implementations described below, as well as other implementations, may provide other improvements as well.

Figure 1:
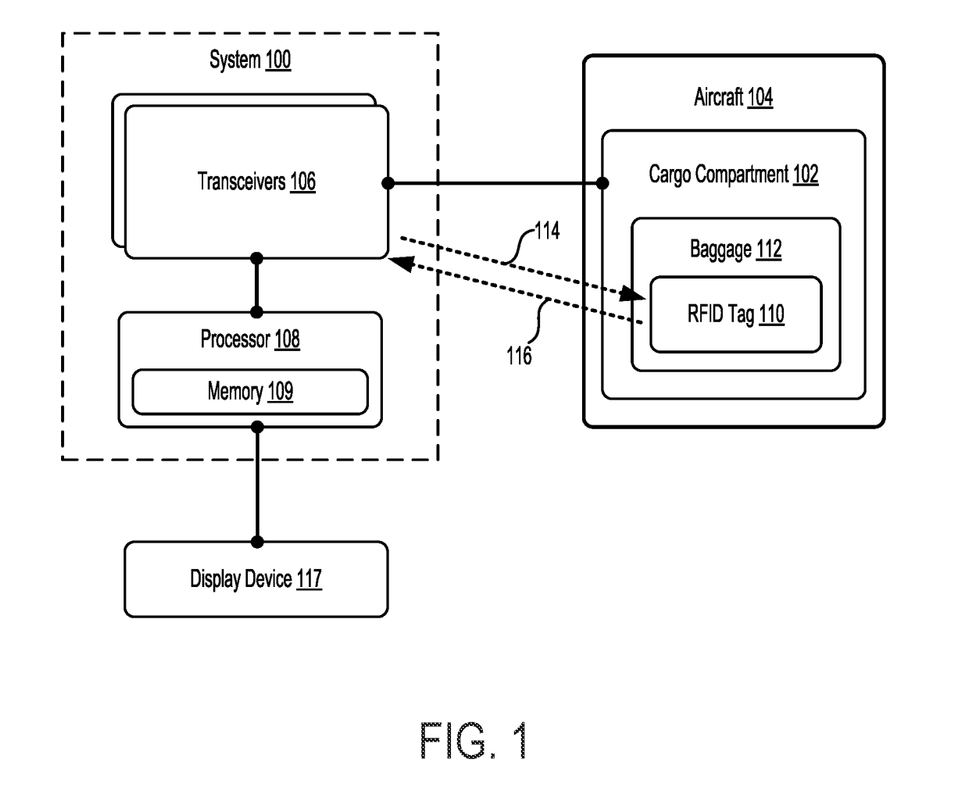
FIG. 1 depicts a system, according to an example implementation.

Referring now to the figures, FIG. 1 depicts a system 100 for localizing baggage within a cargo compartment 102 of an aircraft 104. The system 100 includes at least two transceivers 106 and a processor 108 that is communicatively coupled (e.g., via a wired or wireless communication link) to the transceivers 106. As indicated above, the transceivers 106 are configured to be coupled to an interior of the cargo compartment 102, and also configured to detect RFID signals from an RFID tag 110 coupled to baggage 112 stored in the cargo compartment 102. Within examples, the RFID tag 110 is affixed to a paper baggage tag that is coupled to the baggage 112, such as a paper tag that is temporarily attached to the baggage 112 when the passenger checks the baggage 112 to be loaded onto the aircraft 104. Within other examples, the RFID tag 110 can be affixed to the baggage 112 in another manner.

The transceivers 106 are antennas configured to send and receive (i.e., detect) signals. Within examples, each of the transceivers 106 transmits a signal 114 having specific data that makes that signal 114 differentiable with respect to other signals. The RFID tag 110 receives the signal 114, which activates the RFID tag 110 and causes the RFID tag 110 to send back a signal 116 that contains the original data as well as additional data that is specific to the RFID tag 110, which enables the processor 108 to identify which RFID tag the signal 116 came from. Within other examples, when activated, the RFID tag 110 modulates the original signal and transmits a signal back to the transceiver, which enables the processor 108 to identify which RFID tag the signal 116 came from. Other example RFID signaling is possible as well.

Also shown in FIG. 1 is a display device 117 that is communicatively coupled to the processor 108. The display device 117 can take the form of a computing device configured to receive instructions from the processor 108 and responsively display information on a display that is integral with or separate from (but connected to) to the computing device. Within examples, the display device 117 is a smartphone, tablet computer, personal computer, or laptop computer having a touchscreen or other type of display. Other examples are possible as well.

The processor 108 can be a general-purpose processor or special purpose processor (e.g., a digital signal processor, application specific integrated circuit, etc.) of a computing device. The processor 108 is configured to execute instructions (e.g., computer-readable program instructions including computer executable code) that are stored in memory 109 and are executable to provide various operations described herein.

The memory 109 that stores the instructions can take the form of one or more computer-readable storage media that can be read or accessed by the processor 108. The computer-readable storage media can include volatile and/or non-volatile storage components, such as optical, magnetic, organic or other memory 109 or disc storage, which can be integrated in whole or in part with the processor 108. The memory 109 is considered non-transitory computer readable media. In some examples, the memory 109 can be implemented using a single physical device (e.g., one optical, magnetic, organic or other memory or disc storage unit), while in other examples, the memory 109 can be implemented using two or more physical devices.

The processor 108 is configured to perform various operations, which will now be described in more detail. Although the following examples are described primarily as involving two transceivers for a given cargo compartment, more than two transceivers can be used in other examples.

The following operations can be performed in various scenarios, such as when a passenger has checked their bag but does not show up to the gate. In such a scenario, the processor 108 might receive (e.g., from a computing device operated by the airline for the aircraft 104) a notification to remove the baggage 112 from the cargo compartment 102 and will perform the following operations in response to receiving the notification.

Figure 2:
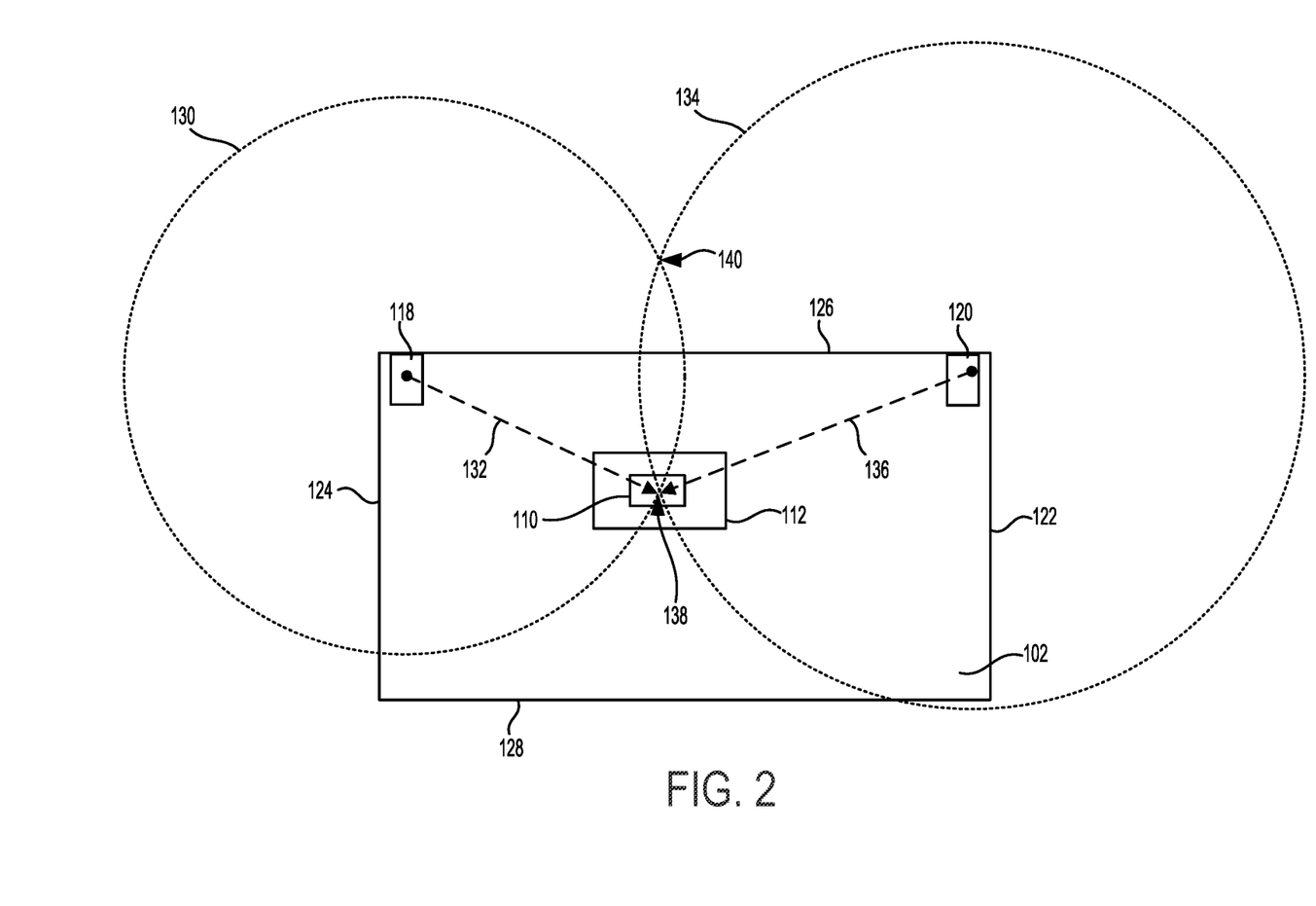
FIG. 2 depicts a localization of baggage within a cargo compartment, according to an example implementation.

FIG. 2 depicts localization of baggage 112 within the cargo compartment 102, in accordance with an example implementation. As shown, the transceivers 106 include a first transceiver 118 and a second transceiver 120. The cargo compartment 102 includes a front side 122, an aft side 124, a first longitudinal side 126, and a second longitudinal side 128. The first transceiver 118 is coupled to the first longitudinal side 126, proximate to the aft side 124, and the second transceiver 120 is coupled to the second longitudinal side 128, proximate to the front side 122. Within examples, the cargo compartment 102 includes one or more doors (not shown) located on the first longitudinal side 126 and/or the second longitudinal side 128.

In operation, the processor 108 receives RFID signals detected by the transceivers 106. More particularly, the processor 108 controls each transceiver to send out a signal in various directions from a known location of the transceiver. And in line with the discussion above, for each signal the RFID tag 110 receives from a given transceiver, the RFID tag 110 generates and transmits a signal in various directions, which is then received by that transceiver. When a signal is received at/detected by a transceiver from the RFID tag 110, the processor 108 determines (i) that the signal was received from the RFID tag 110 (i.e., based on the specific code that the RFID tag 110 includes in the signal), (ii) a time that the original signal was transmitted by the transceiver, and (iii) the time at which the signal is received at the transceiver from the RFID tag 110.

Based on runtimes of the RFID signals detected by each transceiver, the processor 108 determines, for each transceiver, a respective distance from the baggage 112 to the transceiver. Specifically, for each transceiver, the processor 108 detects, from the RFID signals detected by that transceiver, an RFID signal having a shortest runtime of the RFID signals detected by that transceiver. The processor 108 then determines the respective distance based on the shortest runtime and a travel speed of the detected RFID signal. In particular, the processor 108 calculates the respective distance to be equal to the runtime of the shortest-runtime RFID signal multiplied by the travel speed of the shortest-runtime RFID signal. In practice, many signals transmitted by the transceivers 106 are reflected from surfaces, and the shortest-runtime signal is selected as the one that represents the likely actual distance between the RFID tag 110 and a respective transceiver, as it is the signal that travelled the shortest total distance.

For each transceiver, the respective distance that the processor 108 determines defines a boundary that is centered at a known location of the transceiver and along which the baggage 112 is estimated to be located with respect to the transceiver. As shown in FIG. 2, for example, a boundary for a given transceiver takes the form of a circle centered at the transceiver and having a radius equal to the respective distance determined for that transceiver. Specifically, FIG. 2 depicts a first boundary 130 and an arrow representing a first respective distance 132 from the first transceiver 118 to the baggage 112 (or, more particularly, to the RFID tag 110), and further depicts a second boundary 134 and an arrow representing a second respective distance 136 from the second transceiver 120 to the baggage 112.

Having determined the respective distances, the processor 108 identifies locations at which the boundaries intersect and, based on the locations at which the boundaries intersect, detects an estimated storage location of the baggage 112.

In practice, with two transceivers, for instance, the boundaries intersect at a maximum of two locations. As shown in FIG. 2, the locations at which the boundaries intersect include a first location 138 within the cargo compartment 102 and at least one other location 140 outside of the cargo compartment 102. In many cases, the at least one other location 140 is also exterior to the aircraft 104 (not shown in FIG. 2). Given these points of intersection, the processor 108 detects which of the locations is the first location 138 and selects the first location 138 to be the estimated storage location of the baggage 112. The positioning of the first transceiver 118 and the second transceiver 120 on the same side of the cargo compartment 102—that is, the first longitudinal side 126 as shown in FIG. 2, improves localization of the baggage 112 because it causes one of the intersection points to be outside of the cargo compartment 102, thus eliminating that location from consideration.

Having detected the estimated storage location of the baggage 112—that is, the first location 138, in the above-described example—the processor 108 controls the display device 117 (not shown in FIG. 2) to display the estimated storage location. Within examples, the act of controlling the display device 117 to display the estimated storage location involves the processor 108 transmitting an instruction to the display device 117 for the display device to display the estimated storage location. The processor 108 can also store the estimated storage location in memory 109. The manner in which the display device 117 displays the estimated storage location can take various forms, one of which is described with respect to FIG. 3.

Figure 3:
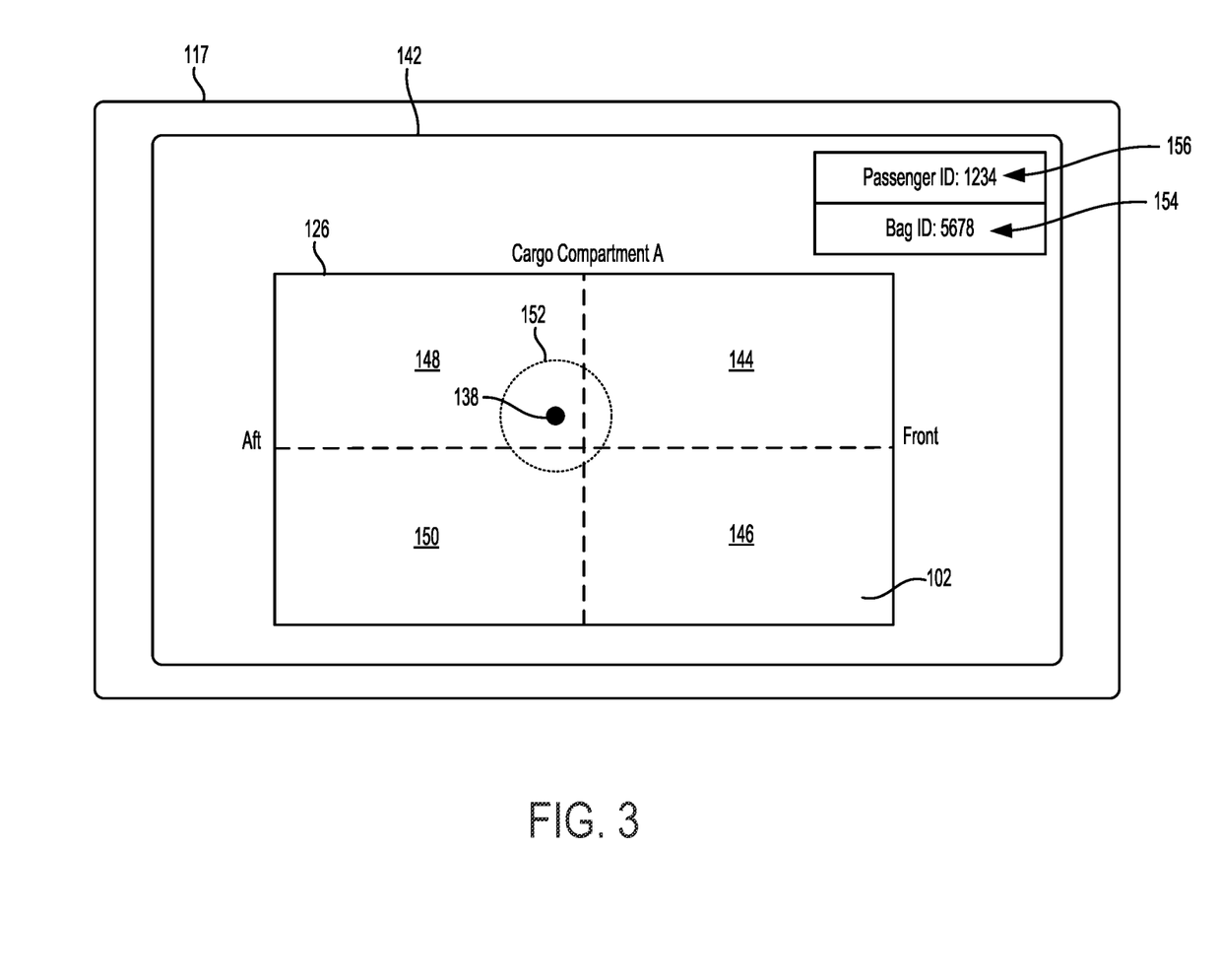
FIG. 3 depicts a display device displaying an estimated storage location of the baggage within the cargo compartment, according to an example implementation.

FIG. 3 depicts the display device 117 displaying the estimated storage location of the baggage 112, according to an example implementation. In line with the example above, the estimated storage location is the first location 138.

The display device 117 includes a display 142, such as a touchscreen. Within examples, upon receipt of instructions from the processor 108, the display device 117 displays a graphical user interface including graphical elements representing the cargo compartment 102, the estimated storage location within the cargo compartment, and additional information.

In some such examples, the cargo compartment 102 is divided into a plurality of regions and the processor 108 instructs the display device 117 to display data identifying, from the plurality of regions, a particular region in which the baggage 112 is located. For instance, as shown in FIG. 3, the cargo compartment 102 is divided into four quadrants, including a front-left section 144, a front-right section 146, an aft-left section 148, and an aft-right section 150. As shown on the display 142, the estimated storage location is located in the aft-left section 148.

Within examples, the processor 108 also determines an uncertainty value associated with the estimated storage location, and the data that identifies the particular region in which the baggage is located (e.g., the aft-left section 148, in the example shown in FIG. 3) includes (i) the plurality of regions of the cargo compartment, (ii) the particular region in which the baggage 112 is located, (iii) an estimated location of the baggage within the particular region, and (iv) a circular uncertainty boundary 152 surrounding the estimated location. The size of the circular uncertainty boundary is defined by the uncertainty value. In practice, a particular bag is tracked during loading and a path to its final position is steady, a calculated uncertainty value associated with that bag will be lower than another bag that is tracked during loading having a path with discontinuities representing instances where the position of that other bag is unknown or less certain.

The uncertainty value can depend on various factors, such as signal blockage, multipath errors (e.g., if the processor 108 detects a reflected signal and uses that signal's runtime as the shortest runtime to calculate one of the respective distances), time measurement errors, and so on. Thus, the uncertainty value and subsequent display of circular uncertainty boundary 152 can be useful to assist human operators with pinpointing the estimated storage location of the baggage 112 with as much accuracy as possible.

In practice, how the cargo compartment 102 is divided into regions, as well as how many regions there are, can depend on the size of the cargo compartment 102, as well as on how accurate the system 100 is. That is, in other examples, there can be more or less regions than shown in FIG. 3.

Within examples, the act of detecting the estimated storage location is further based on an order in which a plurality of bags were loaded into the cargo compartment 102. The order in which the bags are located can be predetermined and provided to the processor 108. Alternatively, the processor 108 can be configured to use the above-described RFID techniques and/or other techniques to track the path of each bag that is located into the cargo compartment 102 and to determine the order in which the bags were loaded into the cargo compartment 102.

Knowing the order in which the bags were loaded into the cargo compartment 102 and tracking the loading path of each bag can help the processor 108, and thus a human operator responsible for unloading the baggage 112, pinpoint the estimated storage location of the baggage 112. For example, if all of the bags were loaded into the cargo compartment 102 through a door (not shown) located on the first longitudinal side 126, the processor 108 can determine, based on the order and loading paths, that the baggage 112 was loaded in later, such as after at least the front-right section 146 and the aft-right section 150 were already filled with other bags.

Additionally or alternatively to determining the order in which bags are loaded into the cargo compartment 102, the processor 108 can be configured to store data correlating a baggage identifier 154 contained in the RFID tag to a passenger identifier 156 associated with a particular passenger of the aircraft 104. The processor 108 can thus control the display device 117 to display the estimated storage location along with the baggage identifier 154 and the passenger identifier 156, as shown in FIG. 3.

Within examples, the processor 108 is configured to store, in memory 109, mapping data that maps each passenger identifier with a corresponding one or more baggage identifiers and one or more estimated storage locations for the one or more baggage identifiers. As such, the processor 108 can control the display device 117 to display, in the same user interface or in a different user interface than that shown in FIG. 3, one or more estimated storage locations for the baggage of any one or more of the passengers. In situations where the aircraft 104 has more than one cargo compartment, the mapping data can also specify which cargo compartment baggage is located. Thus, if the processor 108 receives a notification to remove a passenger's bag from a given cargo compartment, the processor 108 can perform the above-described operations so that a human operator (e.g., an airline employee) is provided with information that identifies the bag's estimated location.

Furthermore, in situations where there are multiple cargo compartments in the aircraft 104, the processor 108 can be configured to perform the above-described operations with respect to each such cargo compartment.

Figure 4:
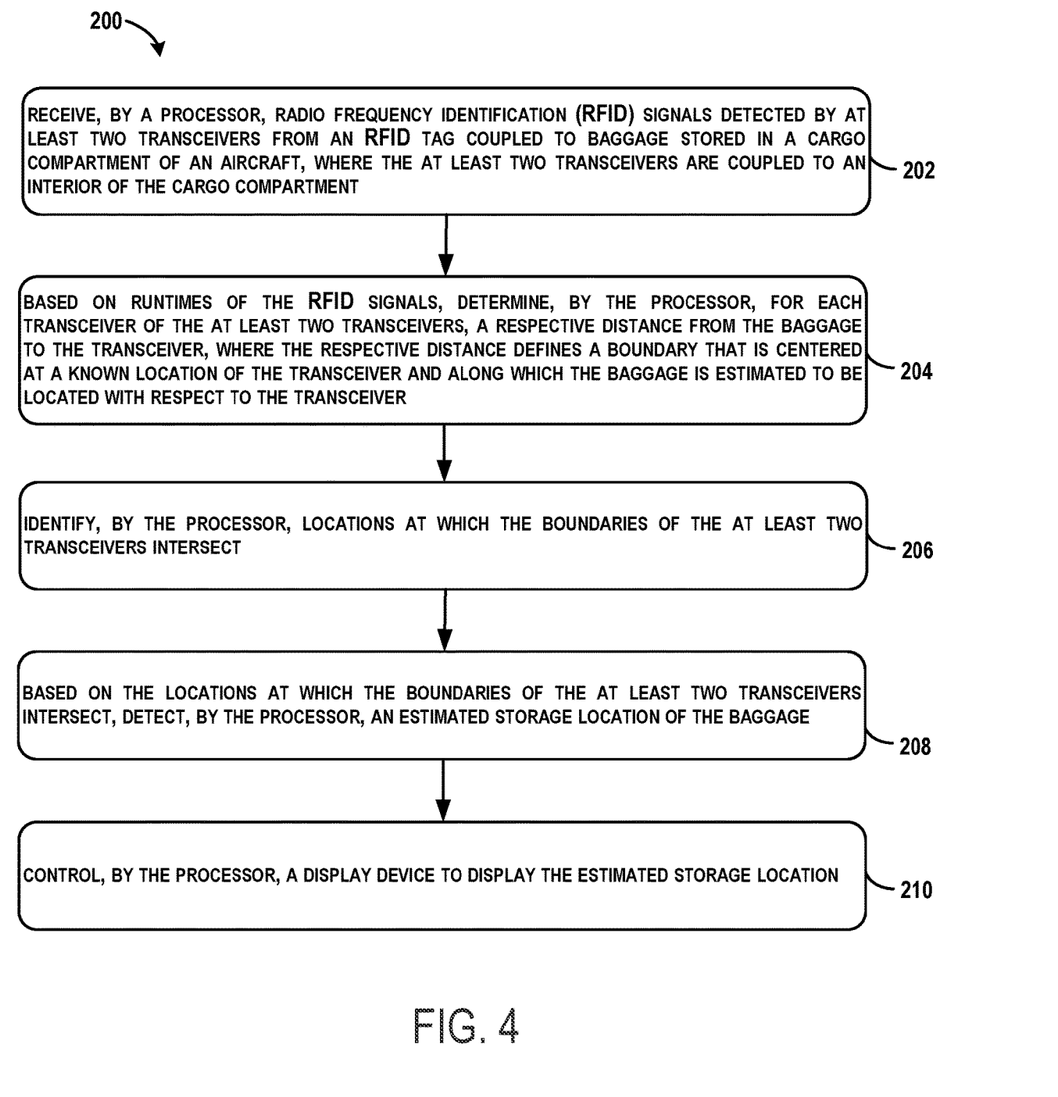
FIG. 4 shows a flowchart of a method, according to an example implementation.

FIG. 4 shows a flowchart of an example of a method 200. Method 200 could be used with the system 100 and components thereof shown in FIG. 1 and in the scenarios shown and described with respect to FIGS. 2 and 3. Method 200 may include one or more operations, functions, or actions as illustrated by one or more of blocks 202-210.

At block 202, the method 200 includes receiving, by a processor, RFID signals detected by at least two transceivers from an RFID tag coupled to baggage stored in a cargo compartment of an aircraft, where the at least two transceivers are coupled to an interior of the cargo compartment.

At block 204, the method 200 includes based on runtimes of the RFID signals, determining, by the processor, for each transceiver of the at least two transceivers, a respective distance from the baggage to the transceiver, where the respective distance defines a boundary that is centered at a known location of the transceiver and along which the baggage is estimated to be located with respect to the transceiver.

At block 206, the method 200 includes identifying, by the processor, locations at which the boundaries of the at least two transceivers intersect.

At block 208, the method 200 includes based on the locations at which the boundaries of the at least two transceivers intersect, detecting, by the processor, an estimated storage location of the baggage.

At block 210, the method 200 includes controlling, by the processor, a display device to display the estimated storage location.

In some embodiments, the method 200 is performed in response to the processor receiving a notification to remove the baggage from the cargo compartment.

In some embodiments, the method 200 also includes storing, by the processor, in memory 109, data correlating a baggage identifier contained in the RFID tag to a passenger identifier associated with a particular passenger of the aircraft, where the controlling of block 210 includes controlling the display device to display the estimated storage location along with the baggage identifier and the passenger identifier.

In some embodiments, the locations at which the boundaries of the at least two transceivers intersect include a first location within the cargo compartment and at least one other location outside of the cargo compartment and exterior to the aircraft, and the detecting of block 208 includes detecting which of the locations is the first location, and selecting the first location to be the estimated storage location.

In some embodiments, the cargo compartment is divided into a plurality of regions, and the controlling of block 210 includes controlling a display device to display data identifying, from the plurality of regions, a particular region in which the baggage is located. Further, in examples of such embodiments, the method 200 also includes determining, by the processor, an uncertainty value associated with the estimated storage location, where the data includes (i) the plurality of regions of the cargo compartment, (ii) the particular region in which the baggage is located, (iii) an estimated location of the baggage within the particular region, and (iv) a circular uncertainty boundary surrounding the estimated location, and where a size of the circular uncertainty boundary is defined by the uncertainty value.

In some embodiments, the detecting of block 208 is further based on an order in which a plurality of bags were loaded into the cargo compartment.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
at least two transceivers configured to be coupled to an interior of a cargo compartment of an aircraft, and further configured to detect radio frequency identification (RFID) signals from an RFID tag coupled to baggage stored in the cargo compartment, wherein the cargo compartment is divided into a plurality of regions; and
a processor configured to perform a set of operations comprising:
receiving the RFID signals detected by the at least two transceivers;
based on runtimes of the RFID signals, determining, for each transceiver of the at least two transceivers, a respective distance from the baggage to the transceiver, wherein the respective distance defines a boundary that is centered at a known location of the transceiver and along which the baggage is estimated to be located with respect to the transceiver;
identifying locations at which the boundaries of the at least two transceivers intersect;
based on the locations at which the boundaries of the at least two transceivers intersect, detecting an estimated storage location of the baggage;
determining an uncertainty value associated with the estimated storage location; and
controlling a display device to display the estimated storage location and data identifying, from the plurality of regions, a particular region in which the bagged is located, wherein the data comprises an estimated location of the baggage within the particular region and a circular uncertainty boundary surrounding the estimated location, and wherein a size of the circular uncertainty boundary is defined by the uncertainty value.

2. The system of claim 1, wherein determining, for each transceiver of the at least two transceivers, the respective distance from the baggage to the transceiver based at least on runtimes of the RFID signals comprises:
for each transceiver of the at least two transceivers:
detecting, from the RFID signals detected by the transceiver, an RFID signal having a shortest runtime of the RFID signals; and
determining the respective distance based on the shortest runtime and a travel speed of the RFID signal.

3. The system of claim 1, wherein the processor is configured to perform a set of operations in response to the processor receiving a notification to remove the baggage from the cargo compartment.

4. The system of claim 1, the set of operations further comprising:
storing, in memory, data correlating a baggage identifier contained in the RFID tag to a passenger identifier associated with a particular passenger of the aircraft, wherein controlling the display device to display the estimated storage location comprises controlling the display device to display the estimated storage location along with the baggage identifier and the passenger identifier.

5. The system of claim 1, wherein the RFID tag is affixed to a paper baggage tag coupled to the baggage.

6. The system of claim 1, wherein:
the locations at which the boundaries of the at least two transceivers intersect comprise a first location within the cargo compartment and at least one other location outside of the cargo compartment and exterior to the aircraft, and
detecting the estimated storage location of the baggage based on the locations at which the boundaries of the at least two transceivers intersect comprises:
detecting which of the locations is the first location, and
selecting the first location to be the estimated storage location.

7. The system of claim 1, wherein:
the plurality of regions comprises four quadrants including a front-left section, a front-right section, an aft-left section, and an aft-right section.

8. The system of claim 1, wherein detecting the estimated storage location of the baggage is further based on an order in which a plurality of bags were loaded into the cargo compartment.

9. The system of claim 1, wherein:
the at least two transceivers comprises a first transceiver and a second transceiver,
the cargo compartment comprises a front side, an aft side, a first longitudinal side, and a second longitudinal side,
the first transceiver of the two transceivers is coupled to the first longitudinal side, proximate to the aft side, and
the second transceiver of the two transceivers is coupled to the first longitudinal side, proximate to the front side.

10. The system of claim 1, wherein controlling the display device to display the estimated storage location comprises transmitting an instruction to the display device for the display device to display the estimated storage location.

11. A method comprising:
receiving, by a processor, radio frequency identification (RFID) signals detected by at least two transceivers from an RFID tag coupled to baggage stored in a cargo compartment of an aircraft, wherein the at least two transceivers are coupled to an interior of the cargo compartment, and wherein the cargo compartment is divided into a plurality of regions;
based on runtimes of the RFID signals, determining, by the processor, for each transceiver of the at least two transceivers, a respective distance from the baggage to the transceiver, wherein the respective distance defines a boundary that is centered at a known location of the transceiver and along which the baggage is estimated to be located with respect to the transceiver;
identifying, by the processor, locations at which the boundaries of the at least two transceivers intersect;
based on the locations at which the boundaries of the at least two transceivers intersect, detecting, by the processor, an estimated storage location of the baggage;
determining an uncertainty value associated with the estimated storage location; and
controlling, by the processor, a display device to display the estimated storage location and data identifying, from the plurality of regions, a particular region in which the baggage is located, wherein the data comprises an estimated location of the baggage within the particular region and a circular uncertainty boundary surrounding the estimated location, and wherein a size of the circular uncertainty boundary is defined by the uncertainty value.

12. The method of claim 11, wherein the method is performed in response to the processor receiving a notification to remove the baggage from the cargo compartment.

13. The method of claim 11, further comprising:
storing, by the processor, in memory, data correlating a baggage identifier contained in the RFID tag to a passenger identifier associated with a particular passenger of the aircraft,
wherein controlling the display device to display the estimated storage location comprises controlling the display device to display the estimated storage location along with the baggage identifier and the passenger identifier.

14. The method of claim 11, wherein:
the locations at which the boundaries of the at least two transceivers intersect comprise a first location within the cargo compartment and at least one other location outside of the cargo compartment and exterior to the aircraft, and
detecting the estimated storage location of the baggage based on the locations at which the boundaries of the at least two transceivers intersect comprises:
detecting which of the locations is the first location, and selecting the first location to be the estimated storage location.

15. The method of claim 11, wherein detecting the estimated storage location of the baggage is further based on an order in which a plurality of bags were loaded into the cargo compartment.

16. A non-transitory computer readable medium having stored thereon instructions, that when executed by one or more processors of a computing device, cause the computing device to perform a set of operations comprising:
receiving radio frequency identification (RFID) signals detected by at least two transceivers from an RFID tag coupled to baggage stored in a cargo compartment of an aircraft, wherein the at least two transceivers are coupled to an interior of the cargo compartment, and wherein the cargo compartment is divided into a plurality of regions;
based on runtimes of the RFID signals, determining, for each transceiver of the at least two transceivers, a respective distance from the baggage to the transceiver, wherein the respective distance defines a boundary that is centered at a known location of the transceiver and along which the baggage is estimated to be located with respect to the transceiver;
identifying locations at which the boundaries of the at least two transceivers intersect;
based on the locations at which the boundaries of the at least two transceivers intersect, detecting an estimated storage location of the baggage;
determining an uncertainty value associated with the estimated storage location; and
controlling a display device to display the estimated storage location and data identifying, from the plurality of regions, a particular region in which the bagged is located, wherein the data comprises an estimated location of the baggage within the particular region and a circular uncertainty boundary surrounding the estimated location, and wherein a size of the circular uncertainty boundary is defined by the uncertainty value.

17. The non-transitory computer readable medium of claim 16, wherein the operation of determining, for each transceiver of the at least two transceivers, the respective distance from the baggage to the transceiver comprises:
for each transceiver of the at least two transceivers:
detecting, from the RFID signals detected by the transceiver, an RFID signal having a shortest runtime of the RFID signals; and
determining the respective distance based on the shortest runtime and a travel speed of the RFID signal.

18. The non-transitory computer readable medium of claim 16, further comprising:
receiving a notification to remove the baggage from the cargo compartment; and responsive to receiving the notification, storing, in memory, data correlating a baggage identifier contained in the RFID tag to a passenger identifier associated with a particular passenger of the aircraft; and
controlling the display device to further display the estimated storage location along with the baggage identifier and the passenger identifier.

19. The non-transitory computer readable medium of claim 16, wherein detecting the estimated storage location of the baggage comprises: detecting the estimated storage location of the baggage further based on an order in which a plurality of bags were loaded into the cargo compartment.

20. The non-transitory computer readable medium of claim 16, wherein the RFID tag is affixed to a paper baggage tag coupled to the baggage.

* * * * *